(12) United States Patent
Zheng et al.

(10) Patent No.: US 11,120,091 B2
(45) Date of Patent: Sep. 14, 2021

(54) SYSTEMS AND METHODS FOR ON-DEMAND SERVICES

(71) Applicant: BEIJING DIDI INFINITY TECHNOLOGY AND DEVELOPMENT CO., LTD., Beijing (CN)

(72) Inventors: Wanji Zheng, Beijing (CN); Huan Chen, Beijing (CN); Peng Yu, Beijing (CN); Qi Song, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/088,548

(22) Filed: Nov. 3, 2020

(65) Prior Publication Data

US 2021/0049224 A1 Feb. 18, 2021

Related U.S. Application Data

(63) Continuation of application No. PCT/CN2018/091200, filed on Jun. 14, 2018.

(51) Int. Cl.
*G06F 16/90* (2019.01)
*G06F 16/9535* (2019.01)
(Continued)

(52) U.S. Cl.
CPC ..... *G06F 16/9535* (2019.01); *G01C 21/3679* (2013.01); *G06F 16/909* (2019.01);
(Continued)

(58) Field of Classification Search
None
See application file for complete search history.

(56) References Cited

U.S. PATENT DOCUMENTS 7,849,071 B2 * 12/2010 Riise .................. G06F 16/9537
707/708
2005/0107949 A1 * 5/2005 Yokota .............. G01C 21/3611
701/532
(Continued)

FOREIGN PATENT DOCUMENTS

CN 103185581 A 7/2013
CN 103778209 A 5/2014
(Continued)

OTHER PUBLICATIONS

International Search Report in PCT/CN2018/091200 dated Mar. 20, 2019, 4 pages.
(Continued)

*Primary Examiner* — Kristopher Andersen
(74) *Attorney, Agent, or Firm* — Metis IP LLC

(57) ABSTRACT

The present disclosure relates to systems and methods for determining target search results associated with a target query. The method may include obtaining a transportation service request including a target address query from a user terminal, and determining a plurality of candidate points of interest (POIs) associated with the target address query. The method may also include identifying one or more target POIs based on the candidate POIs by using a trained identification model. The trained identification model may be configured to provide a correlation probability for each of the one or more target POIs with the target address query. The method may further include ranking some or all of the one or more target POIs to produce a ranking result based on the correlation probabilities, and transmitting the ranking result to the user terminal.

20 Claims, 10 Drawing Sheets

(51) Int. Cl.
  *G06F 16/9532* (2019.01)
  *G06F 16/909* (2019.01)
  *G06F 16/9538* (2019.01)
  *G01C 21/36* (2006.01)
  *G06K 9/62* (2006.01)
  *G01C 21/30* (2006.01)
  *G06K 9/60* (2006.01)

(52) U.S. Cl.
  CPC ...... *G06F 16/9532* (2019.01); *G06F 16/9538* (2019.01); *G06K 9/6256* (2013.01); *G06K 9/6282* (2013.01)

(56) References Cited

U.S. PATENT DOCUMENTS

| | | |
|---|---|---|
| 2011/0208735 A1 | 8/2011 | Gao et al. |
| 2014/0297476 A1 | 10/2014 | Wang et al. |
| 2015/0293976 A1 | 10/2015 | Guo et al. |
| 2016/0335263 A1* | 11/2016 | Yin ...................... G06F 16/9535 |
| 2017/0329782 A1 | 11/2017 | Gui et al. |
| 2018/0017405 A1* | 1/2018 | Chen ....................... H04W 4/02 |

FOREIGN PATENT DOCUMENTS

| | | | |
|---|---|---|---|
| CN | 104462611 A | 3/2015 | |
| CN | WO2016119704 A1 * | 8/2016 | .............. H04W 4/02 |
| CN | 106897788 A | 6/2017 | |
| WO | 2016166309 A1 | 10/2016 | |
| WO | 2016187705 A1 | 12/2016 | |
| WO | 2017158243 A1 | 9/2017 | |

OTHER PUBLICATIONS

Written Opinion in PCT/CN2018/091200 dated Mar. 20, 2019, 5 pages.

* cited by examiner

SYSTEMS AND METHODS FOR ON-DEMAND SERVICES

CROSS-REFERENCE TO RELATED APPLICATIONS

This application is a continuation of International Patent Application No. PCT/CN2018/091200 filed on Jun. 14, 2018, which designates the United States of America, the contents of which are hereby incorporated by reference in their entirety.

TECHNICAL FIELD

The present disclosure generally relates to systems and methods for online to offline services, and in particular, to systems and methods for determining target search results associated with a target query.

BACKGROUND

Online to offline services utilizing Internet technology have become increasingly popular. Take on-demand transportation services (e.g., taxi hailing services) as an example, in some cases, a user can initiate a service request by inputting an address query (e.g., an address query associated with a destination) via a user terminal. After receiving the service request, a system providing on-demand services can determine one or more correlative points of interest (POIs) associated with the address query based on predetermined rules and recommend the POIs to the user terminal. However, in some situations, it can be inefficient to determine the correlative POIs based on the predetermined rules, which are often adjusted manually. Therefore, it is desirable to provide systems and methods for determining correlative POIs associated with an address query automatically and efficiently.

SUMMARY

In one aspect of the present disclosure, a system is provided. The system may include at least one storage medium and at least one processor in communication with the at least one storage medium. The at least one storage medium may include a set of instructions. When executing the set of instructions, the at least one processor may be directed to obtain a transportation service request. The transportation service request may include a target address query from a user terminal. The at least one processor may also be directed to determine a plurality of candidate points of interest (POIs) associated with the target address query. The at least one processor may also be directed to identify one or more target POIs based on the plurality of candidate POIs by using a trained identification model. The trained identification model may be configured to provide a correlation probability for each of the one or more target POIs with the target address query. The at least one processor may further be directed to rank some or all of the one or more target POIs to produce a ranking result based on the correlation probabilities, and transmit the ranking result to the user terminal.

In some embodiments, the trained identification model may be determined with a training process. The training process may include obtaining a plurality of first historical transportation trip records. Each of the plurality of first historical transportation trip records may include a first address query from a user, one or more first POIs associated with the first address query, and a first POI selected by the user from the one or more first POIs as a service location of the transportation trip record. The training process may further include determining a plurality of first samples. The plurality of first samples may include a plurality of first positive samples and a plurality of first negative samples. Each of the plurality of first positive samples may include the first address query and the selected first POI. Each of the plurality of first negative samples may include the first address query and one of the one or more first POIs other than the selected first POI. The training process may further include determining the trained identification model based on a preliminary identification model, the plurality of first positive samples, and the plurality of first negative samples.

In some embodiments, the at least one processor may be directed to extract feature information of each of the plurality of first samples. The at least one processor may also be directed to determine a plurality of sample correlation probabilities corresponding to the plurality of first samples based on the preliminary identification model and the feature information. The at least one processor may also be directed to determine whether the plurality of sample correlation probabilities satisfy a preset condition. The at least one processor may also be directed to designate the preliminary identification model as the trained identification model in response to the determination that the plurality of sample correlation probabilities satisfy the preset condition.

In some embodiments, the feature information of each of the plurality of first samples may include at least one of a first frequency that the first POI was selected as service locations in the plurality of first historical transportation trips, a second frequency that the first POI was transmitted to the users in the plurality of first historical transportation trips, or a similarity between the first address query and the first POI.

In some embodiments, the at least one processor may be directed to determine at least one of a prefix, a key term, or a phrase in the target address query. The at least one processor may also be directed to determine the plurality of candidate POIs based on the prefix, the key term, or the phrase.

In some embodiments, the trained identification model may include a binary classification tree model.

In some embodiments, the at least one processor may be directed to determine a correlation threshold associated with the trained identification model. The at least one processor may also be directed to determine whether a number of eligible target POIs is less than a threshold. The correlation probability between the target address query and the eligible target POI may be larger than the correlation threshold. The at least one processor may also be directed to obtain one or more supplementary POIs associated with the target address query from a third party in response to the determination that the number of the eligible target POIs is less than the threshold. The at least one processor may also be directed to add the one or more supplementary POIs to the one or more target POIs.

In some embodiments, the at least one processor may be directed to obtain a plurality of second historical transportation trip records. The at least one processor may also be directed to establish a precision-recall relationship based on the plurality of second historical transportation trip records and the trained identification model. The at least one processor may also be directed to obtain a reference precision. The at least one processor may also be directed to determine the correlation threshold based on the reference precision and the precision-recall relationship.

In some embodiments, the at least one processor may be directed to determine a plurality of actual positive examples and a plurality of actual negative examples based on the plurality of second historical transportation trip records. The at least one processor may also be directed to determine a plurality of predicted positive examples and a plurality of predicted negative examples based on the plurality of second historical transportation trip records and the trained identification model. The at least one processor may also be directed to establish the precision-recall relationship based on the plurality of actual positive examples, the plurality of actual negative examples, the plurality of predicted positive examples, and the plurality of predicted negative examples.

In another aspect of the present disclosure, a method is provided. The method may be implemented on a computing device having at least one processor, at least one storage medium, and a communication platform connected to a network. The method may include obtaining a transportation service request including a target address query from a user terminal. The method may also include determining a plurality of candidate points of interest (POIs) associated with the target address query. The method may also include identifying one or more target POIs based on the plurality of candidate POIs by using a trained identification model. The trained identification model may be configured to provide a correlation probability for each of the one or more target POIs with the target address query. The method may also include ranking some or all of the one or more target POIs to produce a ranking result based on the correlation probabilities. The method may also include transmitting the ranking result to the user terminal.

In some embodiments, the trained identification model may be determined with a training process. The training process may include obtaining a plurality of first historical transportation trip records. Each of the plurality of first historical transportation trip records may include a first address query from a user, one or more first POIs associated with the first address query, and a first POI selected by the user from the one or more first POIs as a service location of the transportation trip record. The training process may further include determining a plurality of first samples. The plurality of first samples may include a plurality of first positive samples and a plurality of first negative samples. Each of the plurality of first positive samples may include the first address query and the selected first POI. Each of the plurality of first negative samples may include the first address query and one of the one or more first POIs other than the selected first POI. The training process may further include determining the trained identification model based on a preliminary identification model, the plurality of first positive samples, and the plurality of first negative samples.

In some embodiments, the method may include extracting feature information of each of the plurality of first samples. The method may also include determining a plurality of sample correlation probabilities corresponding to the plurality of first samples based on the preliminary identification model and the feature information. The method may also include determining whether the plurality of sample correlation probabilities satisfy a preset condition. The method may also include designating the preliminary identification model as the trained identification model in response to the determination that the plurality of sample correlation probabilities satisfy the preset condition.

In some embodiments, the feature information of each of the plurality of first samples may include at least one of a first frequency that the first POI was selected as service locations in the plurality of first historical transportation trips, a second frequency that the first POI was transmitted to the users in the plurality of first historical transportation trips, or a similarity between the first address query and the first POI.

In some embodiments, the method may include determining at least one of a prefix, a key term, or a phrase in the target address query. The method may also include determining the plurality of candidate POIs based on the prefix, the key term, or the phrase.

In some embodiments, the trained identification model may include a binary classification tree model.

In some embodiments, the method may include determining a correlation threshold associated with the trained identification model. The method may also include determining whether a number of eligible target POIs is less than a threshold. The correlation probability between the target address query and the eligible target POI may be larger than the correlation threshold. The method may also include obtaining one or more supplementary POIs associated with the target address query from a third party in response to the determination that the number of the eligible target POIs is less than the threshold. The method may also include adding the one or more supplementary POIs to the one or more target POIs.

In some embodiments, the method may include obtaining a plurality of second historical transportation trip records. The method may also include establishing a precision-recall relationship based on the plurality of second historical transportation trip records and the trained identification model. The method may also include obtaining a reference precision. The method may also include determining the correlation threshold based on the reference precision and the precision-recall relationship.

In some embodiments, the method may include determining a plurality of actual positive examples and a plurality of actual negative examples based on the plurality of second historical transportation trip records. The method may also include determining a plurality of predicted positive examples and a plurality of predicted negative examples based on the plurality of second historical transportation trip records and the trained identification model. The method may also include establishing the precision-recall relationship based on the plurality of actual positive examples, the plurality of actual negative examples, the plurality of predicted positive examples, and the plurality of predicted negative examples.

In another aspect of the present disclosure, a non-transitory computer readable medium is provided. The non-transitory computer readable medium, including executable instructions that, when executed by at least one processor, may direct the at least one processor to perform a method. The method may include obtaining a transportation service request including a target address query from a user terminal. The method may also include determining a plurality of candidate points of interest (POIs) associated with the target address query. The method may also include identifying one or more target POIs based on the plurality of candidate POIs by using a trained identification model. The trained identification model may be configured to provide a correlation probability for each of the one or more target POIs with the target address query. The method may also include ranking some or all of the one or more target POIs to produce a ranking result based on the correlation probabilities. The method may also include transmitting the ranking result to the user terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
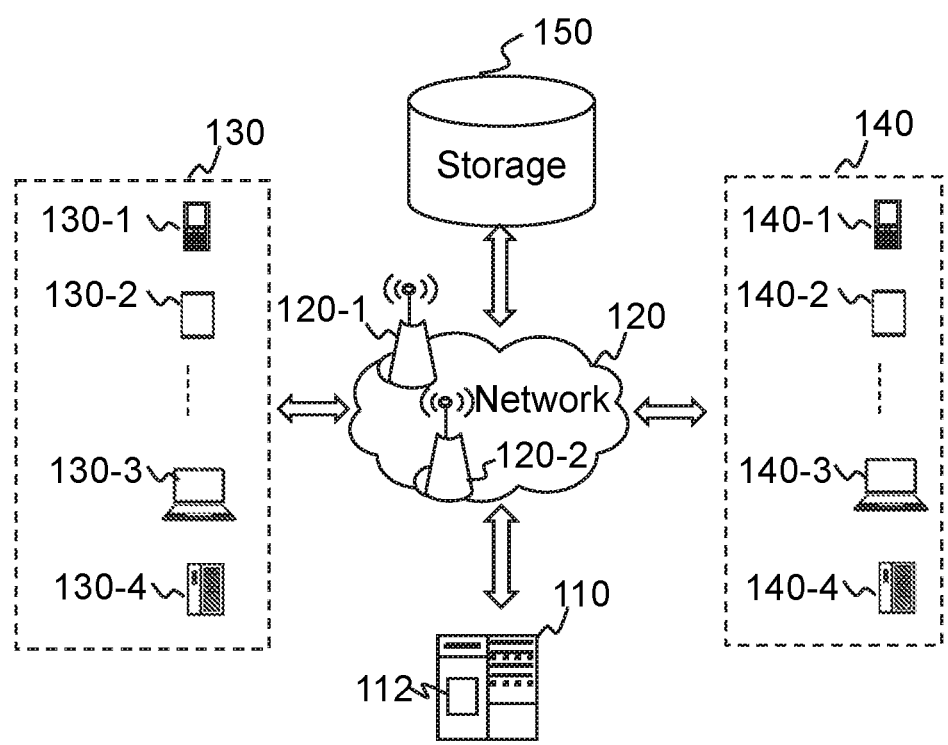
FIG. 1 is a schematic diagram illustrating an exemplary on-demand service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The terms "passenger," "requester," "requestor," "service requester," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for recommending one or more target points of interest (POIs) associated with a transportation service request to a user terminal. In addition, the present disclosure also relates to providing the one or more target POIs to a user through a user interface. The transportation service request may include a target address query inputted by a user as an intended service location (e.g., a start location, a destination) associated with the transportation service request. In response to the target address query, the systems and methods may determine a plurality of candidate POIs based on a prefix, a key term, or a phrase of the target address query. Further, the systems and methods may identify one or more target POIs from the plurality of candidate POIs based on a trained identification model (e.g., a binary classification tree model) and transmit a ranking result associated with some or all of the one or more target POIs to the user terminal. In the disclosure, the trained identification model may be trained based on a plurality of historical transportation trip records. According to the trained identification model, the systems and methods may identify the target POIs automatically and efficiently.

It should be noted that while queries for points of interest (POIs) are used as examples for the present disclosure, the optimization of other types of queries can also utilize the methods and systems herein disclosed. Instead of target POIs, target terms of interest (TOIs), as a general subject matter, can also be provided based on the query inputted by a user and historical data. The POIs and the scenario of transportation service are used as examples for the methods and systems herein disclosed, not as limitations. In addition, the queries or POIs or TOIs of the present disclosure may refer to complete or incomplete entries from a user.

It should be noted that online on-demand transportation service, such as online taxi-hailing including taxi hailing combination services, is a new form of service rooted only in post-Internet era. It provides technical solutions to users and service providers that could raise only in post-Internet era. In pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

FIG. 1 is a schematic diagram illustrating an exemplary on-demand service system according to some embodiments of the present disclosure. In some embodiments, the on-demand service system may be a system for online to offline services. For example, the on-demand service system 100 may be an online transportation service platform for transportation services such as taxi hailing, chauffeur services, delivery vehicles, express car, carpool, bus service, driver hiring, and shuttle services. The on-demand service system 100 may include a server 110, a network 120, a requester terminal 130, a provider terminal 140, and a storage 150.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may be directly connected to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2.

In some embodiments, the server 110 may include a processing engine 112. The processing engine 112 may process information and/or data relating to a service request to perform one or more functions described in the present disclosure. For example, the processing engine 112 may identify one or more target POIs associated with a target address query by using a trained identification model. The trained identification model may be configured to provide a correlation probability for each of the one or more target POIs with the target address query. In some embodiments, the processing engine 112 may include one or more processing engines (e.g., single-core processing engine(s) or multi-core processor(s)). The processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requester terminal 130, the provider terminal 140, or the storage 150) may transmit information and/or data to other component(s) of the on-demand service system 100 via the network 120. For example, the server 110 may obtain a service request from the requester terminal 130 via the network 120. In some embodiments, the network 120 may be any type of wired or wireless network, or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to send a service request for a user B or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a user D, and/or information or instructions from the server 110.

In some embodiments, the requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include an onboard computer, an onboard television, etc. In some embodiments, the requester terminal 130 may be a device with positioning technology for locating the location of the service requester and/or the requester terminal 130.

In some embodiments, the provider terminal 140 may be similar to, or the same device as the requester terminal 130. In some embodiments, the provider terminal 140 may be a device with positioning technology for locating the location of the service provider and/or the provider terminal 140. In some embodiments, the requester terminal 130 and/or the provider terminal 140 may communicate with other positioning device to determine the location of the service requester, the requester terminal 130, the service provider, and/or the provider terminal 140. In some embodiments, the requester terminal 130 and/or the provider terminal 140 may send positioning information to the server 110.

The storage 150 may store data and/or instructions relating to the service request. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requester terminal 130, the provider terminal 140). One or more components of the on-demand service system 100 may access the data and/or instructions stored in the storage 150 via the network 120. In some embodiments, the storage 150 may be directly connected to or communicate with one or more components of the on-demand service system 100 (e.g., the server 110, the requester terminal 130, the provider terminal 140). In some embodiments, the storage 150 may be part of the server 110.

In some embodiments, one or more components of the on-demand service system 100 (e.g., the server 110, the requester terminal 130, the provider terminal 140) may have permissions to access the storage 150. In some embodiments, one or more components of the on-demand service system 100 may read and/or modify information relating to the service requester, the service provider, and/or the public when one or more conditions are met. For example, the server 110 may read and/or modify one or more service requesters' information after a service is completed. As another example, the provider terminal 140 may access information relating to the service requester when receiving a service request from the requester terminal 130, but the provider terminal 140 may not modify the relevant information of the service requester.

In some embodiments, information exchanging of one or more components of the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element (or component) of the on-demand service system 100 performs, the element may perform through electrical signals and/or electromagnetic signals. For example, when the requester terminal 130 transmits out a service request to the server 110, a processor of the requester terminal 130 may generate an electrical signal encoding the request. The processor of the requester terminal 130 may then transmit the electrical signal to an output port. If the requester terminal 130 communicates with the server 110 via a wired network, the output port may be physically connected to a cable, which further may transmit the electrical signal to an input port of the server 110. If the requester terminal 130 communicates with the server 110 via a wireless network, the output port of the requester terminal 130 may be one or more antennas, which convert the electrical signal to electromagnetic signal. Similarly, the provider terminal 140 may process a task through operation of logic circuits in its processor, and receive an instruction and/or a service request from the server 110 via electrical signals or electromagnet signals. Within an electronic device, such as the requester terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium (e.g., the storage 150), it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
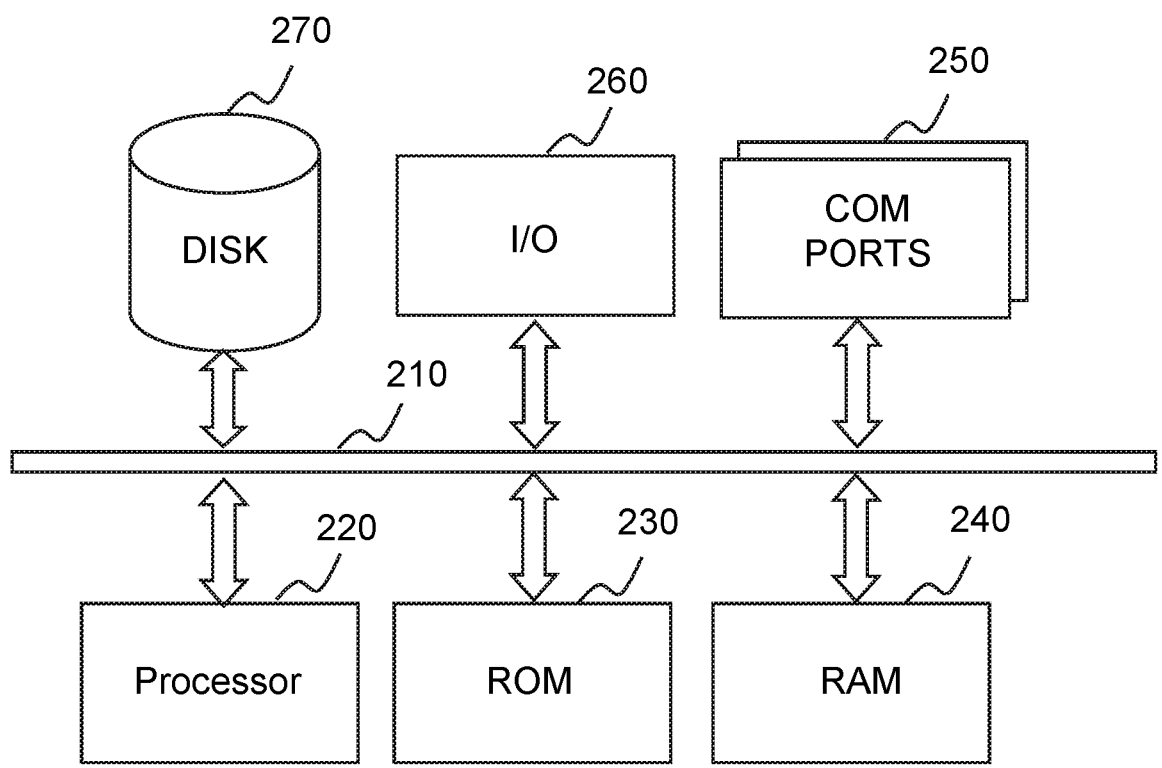
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. In some embodiments, the server 110, the requester terminal 130, and/or the provider terminal 140 may be implemented on the computing device 200. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
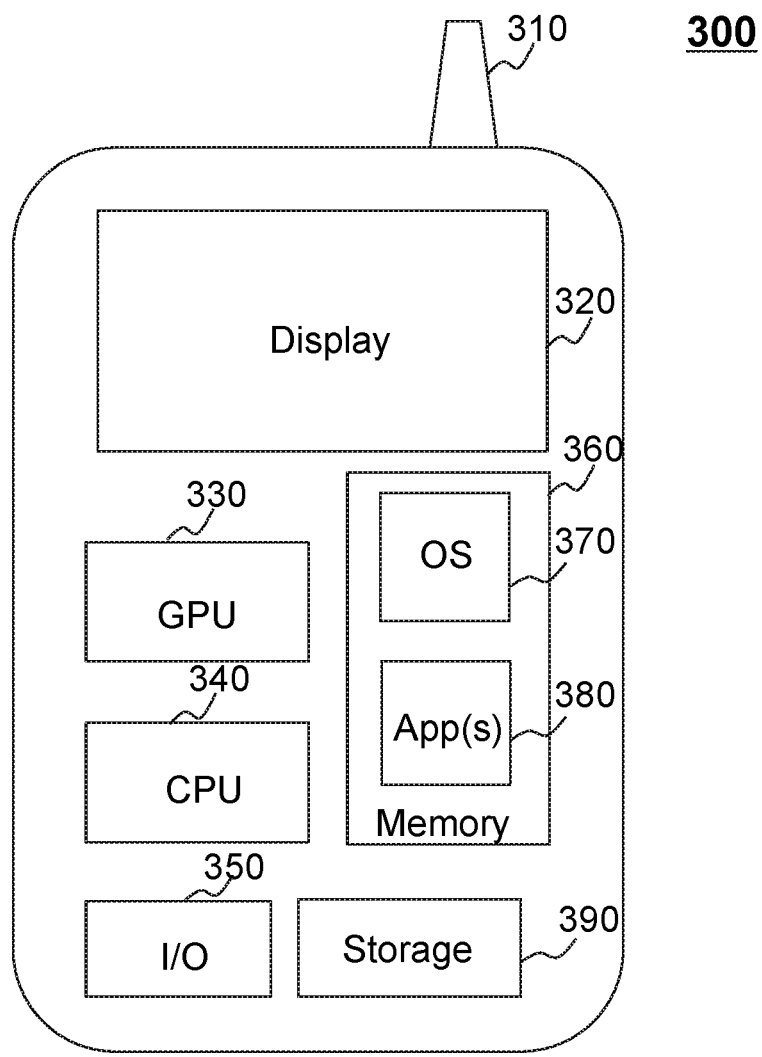
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the requester terminal 130 or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to on-demand services or other information from the on-demand service system 100. User interactions with the information stream may be achieved via the I/O 350 and provided to the processing engine 112 and/or other components of the on-demand service system 100 via the network 120.

Figure 4:
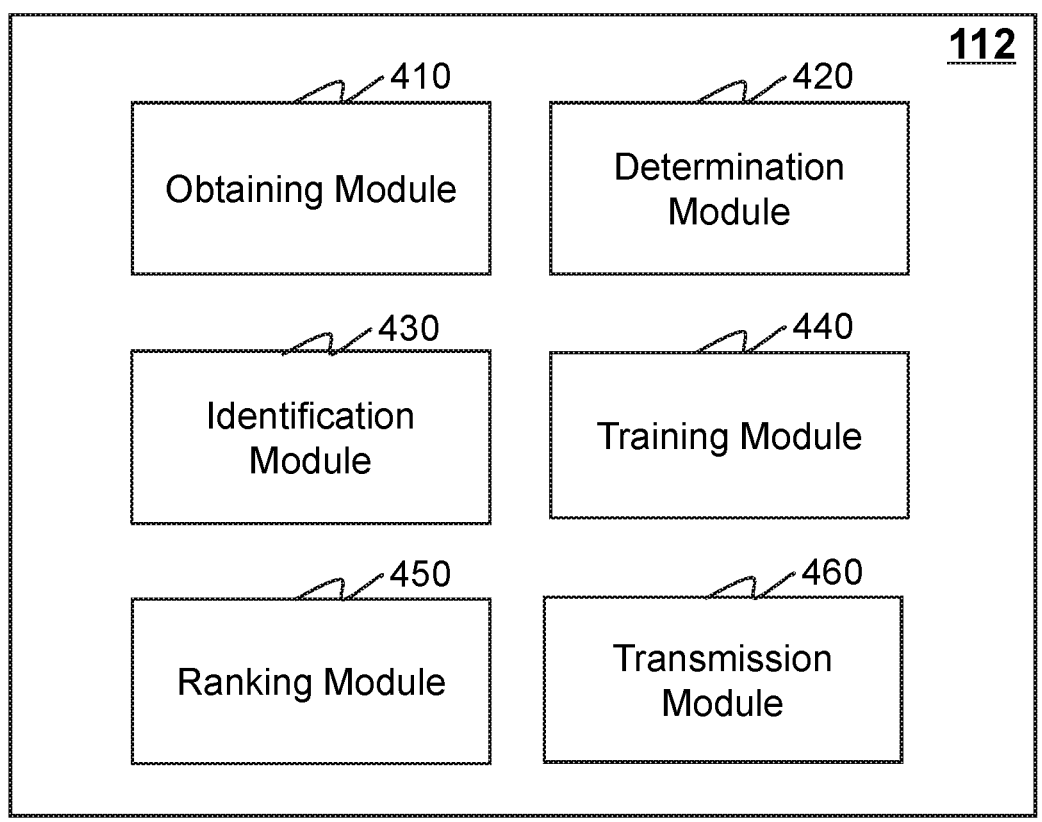
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an obtaining module 410, a determination module 420, an identification module 430, a training module 440, a ranking module 450, and a transmission module 460.

The obtaining module 410 may be configured to obtain a transportation service request including a target address query from the requester terminal 130. In some embodiments, the target address query may refer to a name of an intended location (e.g., a start location, a destination) associated with the transportation service request. In some embodiments, a requester may input the target address query via the requester terminal 130. For example, the requester may input the query in a specific field in an application installed on the requester terminal 130. In some embodiments, the requester may input the target address query via a typing interface, a hand gesturing interface, a voice interface, a picture interface, etc.

In some embodiments, the determination module 420 may be configured to determine a plurality of candidate POIs associated with the target address query. For example, the determination module 420 may determine at least one of a prefix, a key term, or a phrase in the target address query and determine the plurality of candidate POIs based on the prefix, the key term, or the phrase.

In some embodiments, the determination module 420 may first process the target address query and determine the plurality of candidate POIs based on the processed target address query. For example, the determination module 420 may rewrite the target address query (e.g., "Central Business District") as a synonym (e.g., "CBD"). As another example, the determination module 420 may analyze the target address query and if the analysis result indicates that the target address query is misspelled, the determination module 420 may process the target address query by correcting the spelling.

The identification module 430 may be configured to identify one or more target POIs based on the plurality of candidate POIs by using a trained identification model (e.g., a binary classification tree model). In some embodiments, the identification module 430 may obtain the trained identification model from the training module 440 or a storage device (e.g., the storage 150), such as the ones disclosed elsewhere in the present disclosure. As used herein, the trained identification model may be configured to provide a correlation probability for each of the one or more target POIs with the target address query. In some embodiments, the correlation probability may indicate a similarity between a POI and the target address query. The larger the correlation probability is, the higher the similarity between the POI and the target address query may be.

Figure 6:
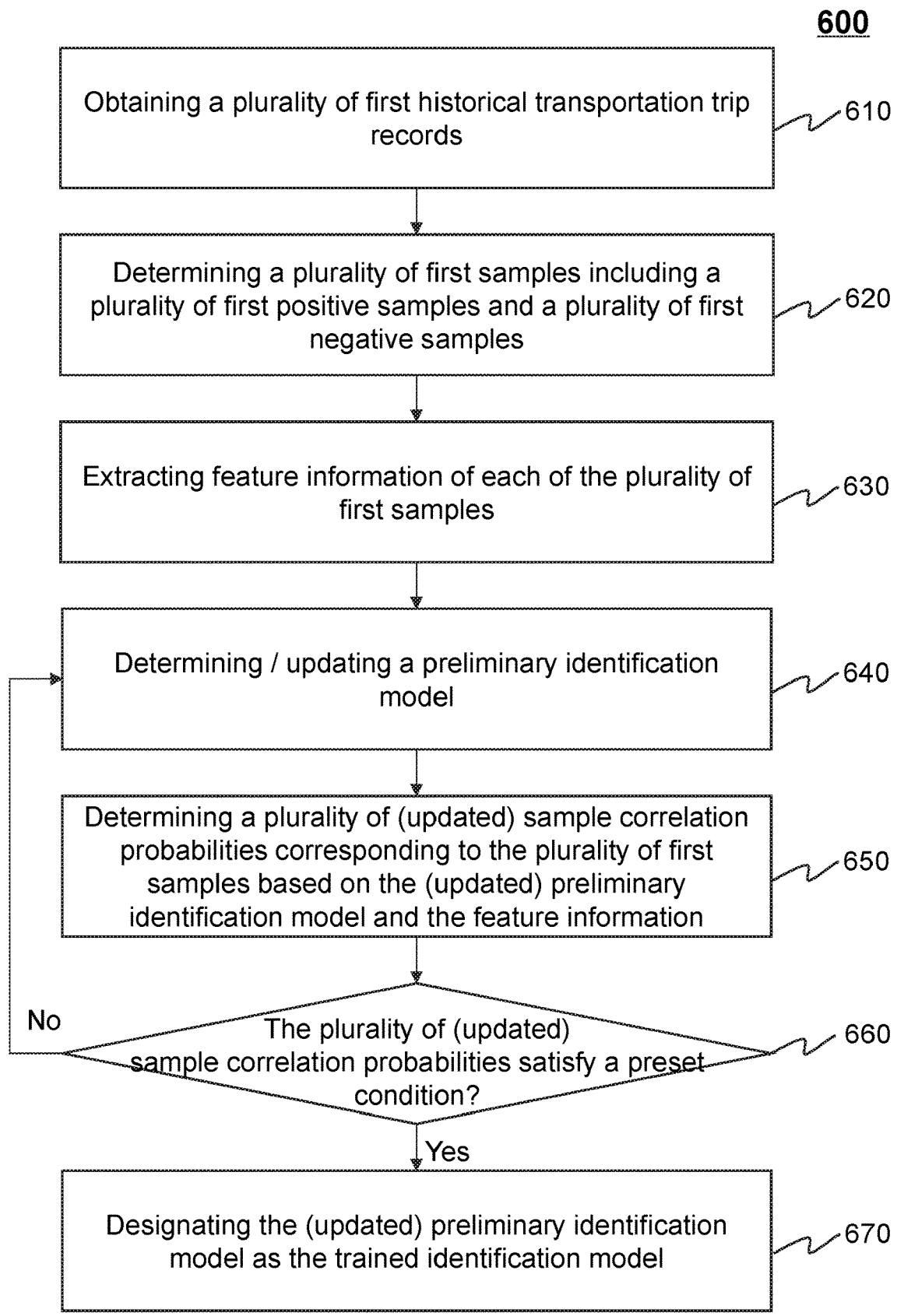
FIG. 6 is a flowchart illustrating an exemplary process for determining a trained identification model according to some embodiments of the present disclosure.

The training module 440 may be configured to determine the trained identification module based on a plurality of historical transportation trip records (e.g., a plurality of first historical transportation trip records described in FIG. 6). Each of the plurality of first historical transportation trip records may include a first address query from a user (e.g., a requester), one or more first POIs associated with the first address query, a first POI selected by the user from the one or more first POIs as a service location (e.g., a historical start location, a historical destination, etc.) of the historical transportation trip record, etc. More descriptions of the trained identification model may be found elsewhere in the present disclosure (e.g., FIG. 6 and the description thereof).

The ranking module 450 may be configured to rank some or all of the one or more target POIs to produce a ranking result based on the correlation probabilities. In some embodiments, the ranking module 450 may rank some or all of the one or more target POIs from large to small or from small to large based on the correlation probabilities. For example, the larger the correlation probability is, the higher the ranking of a corresponding target POI may be. In some embodiments, other than the correlation probabilities, personalized information associated with the requester also may be taken into consideration. For example, the larger a frequency that a target POI was selected by the requester as historical service locations (e.g., a historical start location) in historical service orders within a predetermined period (e.g., the last three months) is, the higher the ranking of the target POI may be.

The transmission module 460 may be configured to transmit the ranking result to one or more components (e.g., the requester terminal 130) of the on-demand service system 100. The requester terminal 130 may display the ranking result via a user interface (not shown) of the requester terminal 130. In some embodiments, the results may be displayed as a list that is close to an input field for the query. The requester may further select a POI from the ranked target POIs as a service location associated with the target address query via the user interface.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 410 and the transmission module 460 may be combined as a single module which may both obtain a transportation service request including a target address query from the requester terminal 130 and transmitting a ranking result of one or more target POIs associated with the target address query to the requester terminal 130. As another example, the processing engine 112 may include a storage module (not shown) which may be used to store data generated by the above-mentioned modules. As a further example, the training module 440 may be unnecessary and the trained identification model may be obtained from a storage device (e.g., the storage 150), such as the ones disclosed elsewhere in the present disclosure.

Figure 5:
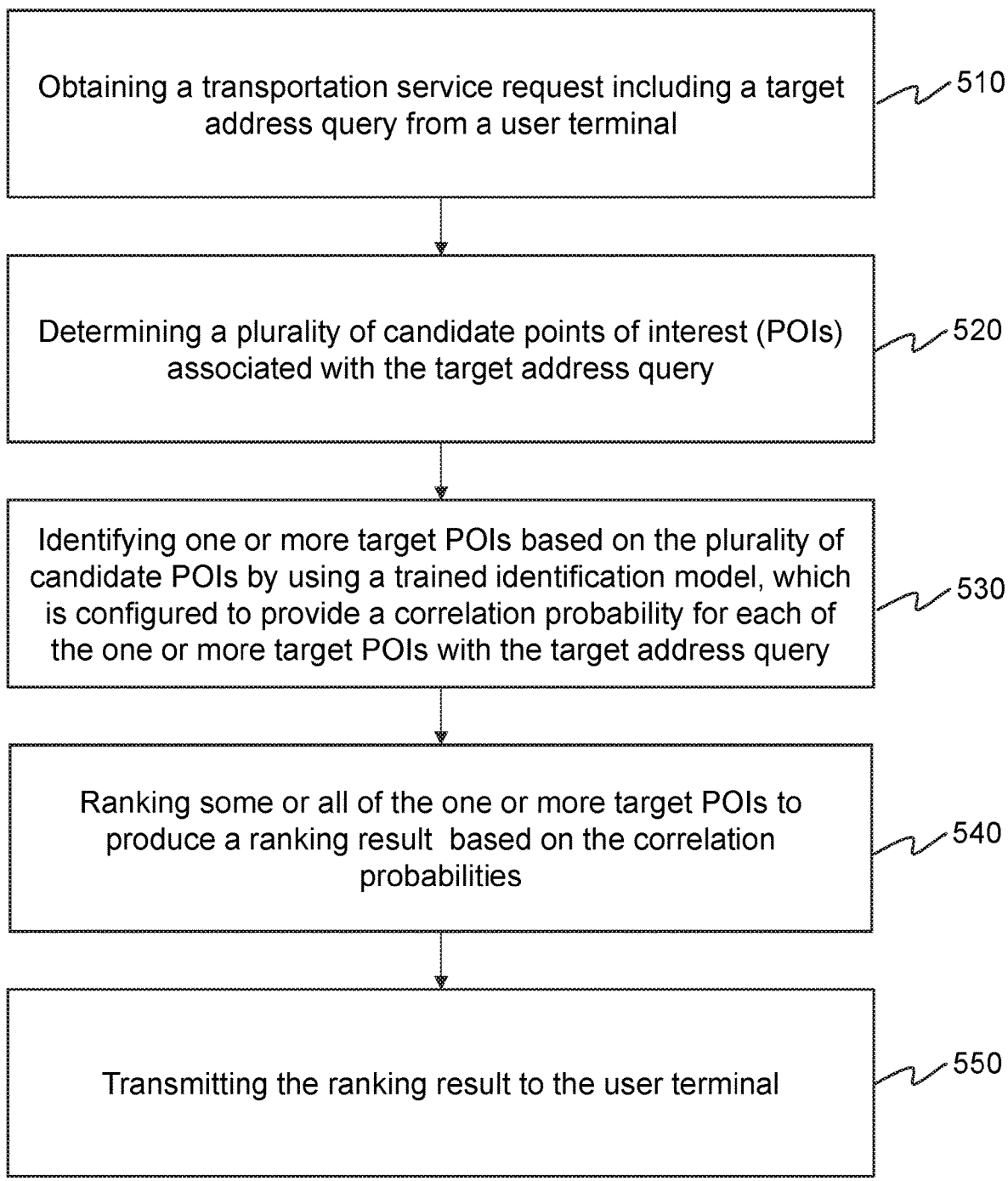
FIG. 5 is a flowchart illustrating an exemplary process for determining and/or transmitting a ranking result associated with one or more target POIs to a user terminal according to some embodiments of the present disclosure.

FIG. 5 is a flowchart illustrating an exemplary process for determining and/or transmitting a ranking result associated with one or more target POIs to a user terminal according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing engine 112 (e.g., the obtaining module 410) (e.g., the interface circuits of the processor 220) may obtain a transportation service request including a target address query from the requester terminal 130.

In some embodiments, the target address query may refer to a name of an intended location (e.g., a start location, a destination) associated with the transportation service request. In some embodiments, a requester may input the target address query via the requester terminal 130. For example, the requester may input the query in a specific field in an application installed on the requester terminal 130. In some embodiments, the requester may input the target address query via a typing interface, a hand gesturing interface, a voice interface, a picture interface, etc.

In 520, the processing engine 112 (e.g., the determination module 420) (e.g., the processing circuits of the processor 220) may determine a plurality of candidate POIs associated with the target address query. In some embodiments, the processing engine 112 may determine at least one of a prefix, a key term, or a phrase in the target address query and determine the plurality of candidate POIs based on the prefix, the key term, or the phrase. For example, if assuming that the target address query includes a key term "central business district," the processing engine 112 may determine a plurality of candidate POIs such as "Central Business District Subway Station," "Central Business District Building," etc.

In some embodiments, the processing engine 112 may first process the target address query and determine the plurality of candidate POIs based on the processed target address query. For example, the processing engine 112 may rewrite the target address query (e.g., "Central Business District") as a synonym (e.g., "CBD"). As another example, the processing engine 112 may analyze the target address query and if the analysis result indicates that the target address query is misspelled, the processing engine 112 may process the target address query by correcting the spelling. In some embodiments, the processing engine 112 may rewrite and/or correct the target address query based on a noise channel model, a Bayes classifier, a maximum entropy model, or the like, or any combination thereof.

In 530, the processing engine 112 (e.g., the identification module 430) (e.g., the processing circuits of the processor 220) may identify one or more target POIs based on the plurality of candidate POIs by using a trained identification model (e.g., a binary classification tree model). The processing engine 112 may obtain the trained identification model from the training module 440 or a storage device (e.g., the storage 150), such as the ones disclosed elsewhere in the present disclosure. As used herein, the trained identification model may be configured to provide a correlation probability for each of the one or more target POIs with the target address query. In some embodiments, the correlation probability may indicate a similarity between a POI and the target address query. The larger the correlation probability is, the higher the similarity between the POI and the target address query may be.

In some embodiments, the processing engine 112 may determine a plurality of correlation probabilities between the plurality of candidate POIs and the target address query. Further, the processing engine 112 may identify the one or more target POIs from the plurality of candidate POIs based on the plurality of correlation probabilities. For example, the processing engine 112 may determine a probability threshold (e.g., 0.7, 0.75, 0.8, 0.85, 0.9, etc.) and identify candidate POI(s) with a correlation probability larger than the probability threshold as the one or more target POIs. As another example, the processing engine 112 may rank (e.g., from large to small) the plurality of candidate POIs based on the plurality of correlation probabilities and identify the one or more target POIs (e.g., top 1, top 5, top 10, top 20, etc.) based on the ranking result.

In 540, the processing engine 112 (e.g., the ranking module 450) (e.g., the processing circuits of the processor 220) may rank some or all of the one or more target POIs to produce a ranking result based on the correlation probabilities associated with the one or more target POIs.

In some embodiments, the processing engine 112 may rank some or all of the one or more target POIs from large to small or from small to large based on the correlation probabilities. For example, the larger the correlation probability is, the higher the ranking of a corresponding target POI may be. In some embodiments, other than the correlation probabilities, personalized information associated with the requester also may be taken into consideration. For example, the larger a frequency that a target POI was selected by the requester as historical service locations (e.g., a historical start location) in historical service orders within a predetermined period (e.g., the last three months) is, the higher the ranking of the target POI may be.

In 550, the processing engine 112 (e.g., the transmission module 460) (e.g., the interface circuits of the processor 220) may transmit the ranking result to the requester terminal 130. The requester terminal 130 may display the ranking result via a user interface (not shown) of the requester terminal 130. In some embodiments, the results may be displayed as a list that is close to an input field for the query. The requester may further select a POI from the ranked target POI(s) as a service location associated with the transportation service request via the user interface.

For illustration purposes, the present disclosure takes a target address query associated with an on-demand transportation service as an example, it should be noted that the processing engine 112 may process other queries associated with other on-demand services (e.g., a map (e.g., GOOGLE Map, BAIDU Map, TENCENT Map)) navigation service, an online shopping service) according to the process and/or method disclosed elsewhere in the present disclosure. Take the online shopping service as an example, the processing engine 112 may obtain an online shopping service request including a search query, wherein the search query may be associated with goods (e.g., clothes, shoes). The processing engine 112 may determine a plurality of candidate search results associated with the search query and select one or more target search results from the plurality of candidate search results.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store information (e.g., the target address query, the target POI(s)) associated with the transportation service request in a storage device (e.g., the storage 150), such as the ones disclosed elsewhere in the present disclosure.

FIG. 6 is a flowchart illustrating an exemplary process for determining a trained identification model according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, the processing engine 112 (e.g., the training module 440) (e.g., the interface circuits of the processor 220) may obtain a plurality of first historical transportation trip records within a predetermined time period (e.g., the last month, the last three months, the last year). The processing engine 112 may obtain the plurality of first historical transportation trip records from a storage device (e.g., the storage 150), such as the ones disclosed elsewhere in the present disclosure.

In some embodiments, each of the plurality of first historical transportation trip records may include a first address query from a user (e.g., a requester), one or more first POIs associated with the first address query, a first POI selected by the user from the one or more first POIs as a service location (e.g., a historical start location, a historical destination) of the historical transportation trip record, etc. As described in connection with 530, the "first POI associated with the first address query" may refer to a POI identified by the processing engine 112 in response to the first address query (similar to the target POI in response to the target address query). For each of the plurality of first historical transportation trip records, some or all of the one or more first POIs were transmitted to the user (i.e., the requester terminal 130) and the user selected one of the one or more first POIs as the service location of the first historical transportation trip record.

In 620, the processing engine 112 (e.g., the training module 440) (e.g., the processing circuits of the processor 220) may determine a plurality of first samples based on the plurality of first historical transportation trip records. The plurality of first samples may include a plurality of first positive samples and a plurality of first negative samples. As used herein, each of the plurality of first positive samples may include the first address query and the selected first POI. Each of the plurality of first negative samples may include the first address query and one of the one or more first POIs other than the selected first POI.

In 630, the processing engine 112 (e.g., the training module 440) (e.g., the processing circuits of the processor 220) may extract feature information of each of the plurality of first samples. Take a specific first sample as an example, the feature information may include a first frequency that the first POI was selected as service locations in the plurality of first historical transportation trips, a second frequency that the first POI was transmitted to the users (i.e., the requester terminals 130) in the plurality of first historical transportation trips, a similarity between the first address query and the first POI, etc.

In 640, the processing engine 112 (e.g., the training module 440) (e.g., the processing circuits of the processor 220) may determine a preliminary identification model. The preliminary identification model may include a preliminary decision tree model (e.g., a preliminary binary classification tree model), a preliminary naive Bayes model, a preliminary boosted tree model, a preliminary nearest neighbor model, a preliminary support vector machine model, etc.

In 650, the processing engine 112 (e.g., the training module 440) (e.g., the processing circuits of the processor 220) may determine a plurality of sample correlation probabilities (also referred to as "first correlation probability") corresponding to the plurality of first samples based on the preliminary identification model and the feature information.

In 660, the processing engine 112 (e.g., the training module 440) (e.g., the processing circuits of the processor 220) may determine whether the plurality of sample correlation probabilities satisfy a preset condition. For example, the processing engine 112 may determine a loss function of the preliminary identification model and determine a value of the loss function based on the plurality of sample correlation probabilities. Further, the processing engine 112 may determine whether the value of the loss function is less than a threshold. The threshold may be default settings of the on-demand service system 100, or may be adjustable under different situations.

In response to the determination that the plurality of sample correlation probabilities satisfy the preset condition, the processing engine 112 (e.g., the training module 440) (e.g., the processing circuits of the processor 220) may designate the preliminary identification model as the trained identification model in 670. On the other hand, in response to the determination that the plurality of sample correlation probabilities does not satisfy the preset condition, the processing engine 112 may execute the process 600 to return to 640 to update the preliminary identification model. For example, the processing engine 112 may update one or more preliminary parameters (e.g., a weight matrix, a bias vector) of the preliminary identification model to produce an updated identification model.

Further, the processing engine 112 may determine whether a plurality of updated sample correlation probabilities under the updated identification model satisfy the preset condition. In response to the determination that the plurality of updated sample correlation probabilities satisfy the preset condition, the processing engine 112 may designate the updated identification model as the trained identification model in 670. On the other hand, in response to the determination that the plurality of updated sample correlation probabilities still does not satisfy the preset condition, the processing engine 112 may still execute the process 600 to return to 640 to update the updated identification model until the plurality of updated sample correlation probabilities satisfy the preset condition.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the training module 440 may update the trained identification model at a certain time interval (e.g., per month, per two months) based on a plurality of newly obtained historical transportation trip records.

Figure 7:
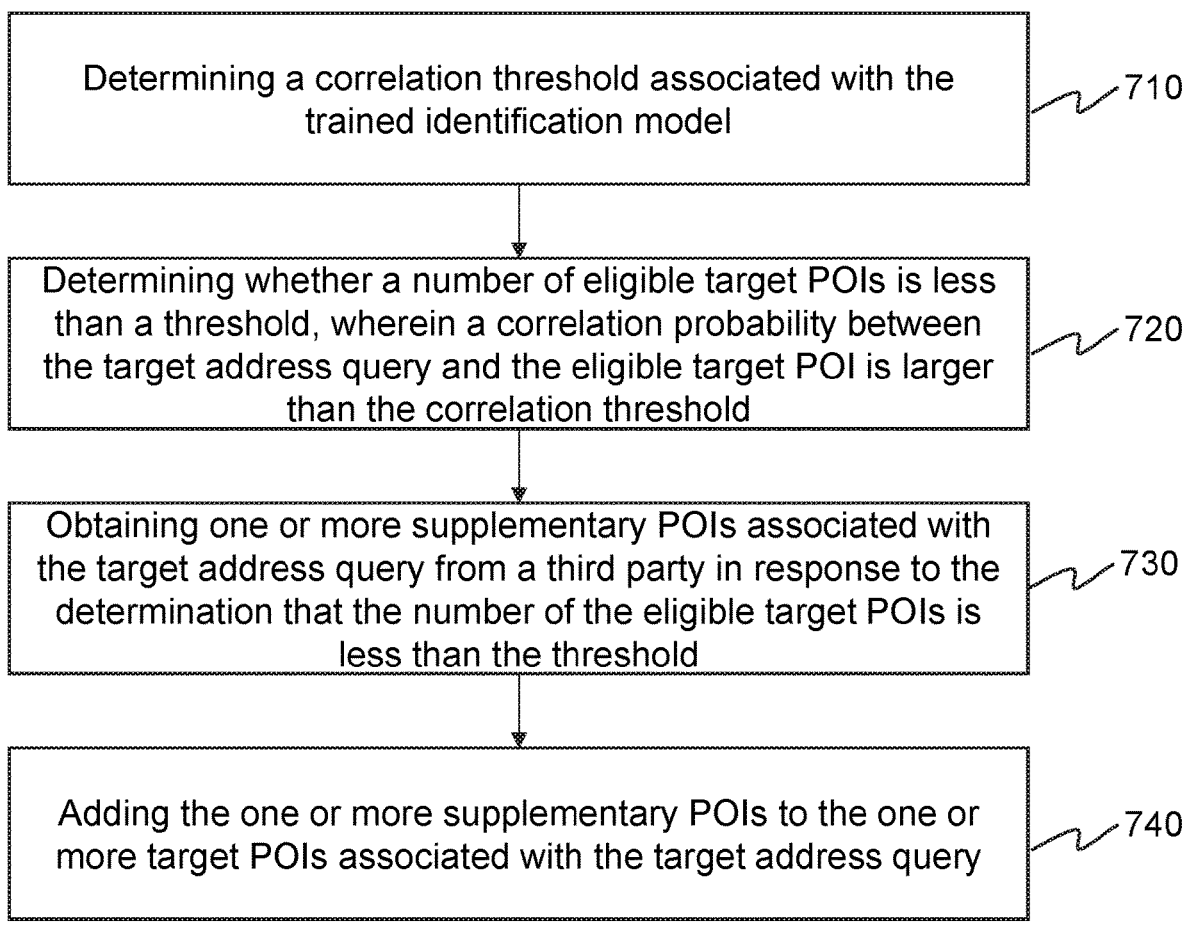
FIG. 7 is a flowchart illustrating an exemplary process for determining one or more supplementary POIs associated with a target address query according to some embodiments of the present disclosure.

FIG. 7 is a flowchart illustrating an exemplary process for determining one or more supplementary POIs associated with a target address query according to some embodiments of the present disclosure. In some embodiments, the process 700 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting.

In some embodiments, as described in connection with 530, after identifying the one or more target POIs based on the trained identification model, the processing engine 112 may determine whether to add supplementary POIs to the one or more target POIs based on process 700 below.

In 710, the processing engine 112 (e.g., the identification module 430) (e.g., the processing circuits of the processor 220) may determine a correlation threshold associated with the trained identification model. In some embodiments, the correlation threshold may be default settings of the on-demand service system 100, or may be adjustable under different situations. In some embodiments, the correlation threshold may be determined based on a plurality of second historical transportation trip records and the trained identification model (e.g., see FIG. 8 and the description thereof).

In 720, the processing engine 112 (e.g., the identification module 430) (e.g., the processing circuits of the processor 220) may determine whether a number of eligible target POIs is less than a threshold, wherein the correlation probability between the target address query and the eligible target POI is larger than the correlation threshold. The threshold for the number of eligible target POIs may be default settings of the on-demand service system 100, or may be adjustable under different situations.

In 730, in response to the determination that the number of the eligible target POIs is less than the threshold, the processing engine 112 (e.g., the identification module 430) (e.g., the processing circuits of the processor 220) may obtain one or more supplementary POIs associated with the target address query from a third party (e.g., an external database). For example, if assuming that the threshold is 60 and the number of the eligible target POIs is 55, the processing engine 112 may obtain 5 supplementary POIs from the third party.

In 740, the processing engine 112 (e.g., the identification module 430) (e.g., the processing circuits of the processor 220) may add the one or more supplementary POIs to the one or more target POIs associated with the target address query. As described in connection with 530 and 540, the processing engine 112 may further rank some or all of the target POIs.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, 730 and 740 may be combined as a single operation in which the processing engine 112 may both obtain the one or more supplementary POIs and add the supplementary POIs to the one or more target POIs.

Figure 8:
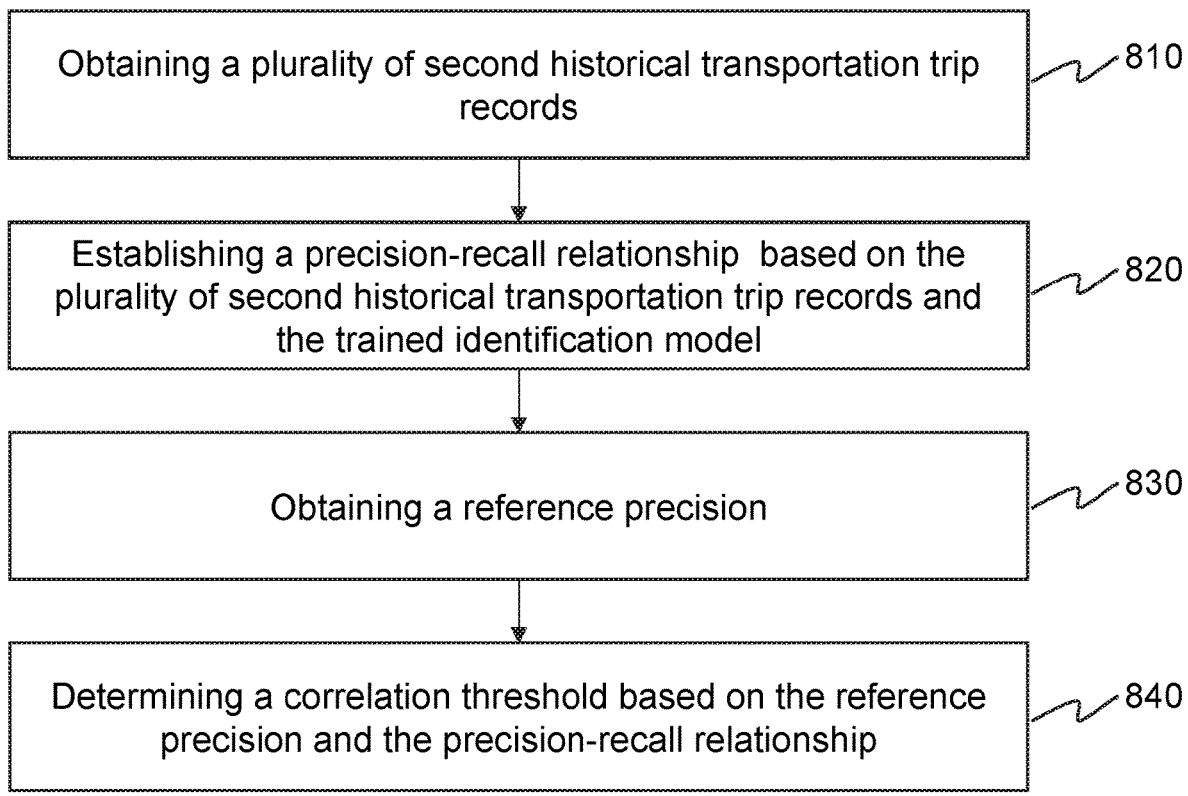
FIG. 8 is a flowchart illustrating an exemplary process for determining a correlation threshold according to some embodiments of the present disclosure.

FIG. 8 is a flowchart illustrating an exemplary process for determining a correlation threshold according to some embodiments of the present disclosure. In some embodiments, the process 800 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting. In some embodiments, operation 710 of process 700 may be performed based on process 800.

In 810, the processing engine 112 (e.g., the identification module 430) (e.g., the interface circuits of the processor 220) may obtain a plurality of second historical transportation trip records. The processing engine 112 may obtain the plurality of second transportation trip records from a storage device (e.g., the storage 150), such as the ones disclosed elsewhere in the present disclosure.

As described in connection with 610, similar to the first historical transportation trip record, each of the plurality of second historical transportation trip records may include a second address query from a user (e.g., a requester), one or more second POIs associated with the second address query, a second POI selected by the user from the one or more second POIs as a service location (e.g., a historical start location, a historical destination) of the historical transportation trip record, etc. In some embodiments, the plurality of second historical transportation trip records may be partially or totally different from the plurality of first historical transportation trip records.

In some embodiments, the processing engine 112 may obtain the plurality of second historical transportation trip records from the storage device based on a stratified sampling process. As used herein, according to the stratified sampling process, the processing engine 112 may obtain a sample set including a plurality of candidate historical transportation trip records (e.g., a sample set including a plurality of historical transportation trip records within a predetermined period (e.g., the last three months, the last year, etc.)) and divide the plurality of candidate historical transportation trip records into a plurality of groups based on reference information associated with a plurality of candidate address queries included in the plurality of candidate historical transportation trip records (e.g., frequencies of the plurality of candidate address queries). As used herein, a frequency of a candidate address query may refer to a ratio of a number that the candidate address query appeared in the plurality of candidate historical transportation trip records to a number of the plurality of candidate transportation trip records. Further, the processing engine 112 may obtain the plurality of second historical transportation trip records from the plurality of groups.

For example, the processing engine 112 may divide the plurality of candidate historical transportation trip records into a first group, a second group, and a third group, wherein frequencies of candidate address queries included in the first group are within (0%, 30%], frequencies of candidate address queries included in the second group are within (31%, 60%], and frequencies of candidate address queries included in the third group are within (61%, 100%). Further, if assuming that a number of candidate historical transportation trip records in the first groups is 5,000, a number of candidate historical transportation trip records in the second group is 3,000, a number of candidate historical transportation trip records in the third group is 2,000, and an intended number of the plurality of second historical transportation trip records is 1000, the processing engine 112 may select 500, 300, and 200 candidate historical transportation trip records from the first group, the second group, and the third group respectively as the plurality of second historical transportation trip records.

In some embodiments, the reference information may also include an area where each candidate historical transportation trip was completed, a time when each candidate historical transportation trip was completed, a type of each candidate historical transportation trip, or the like, or any combination thereof.

Figure 10:
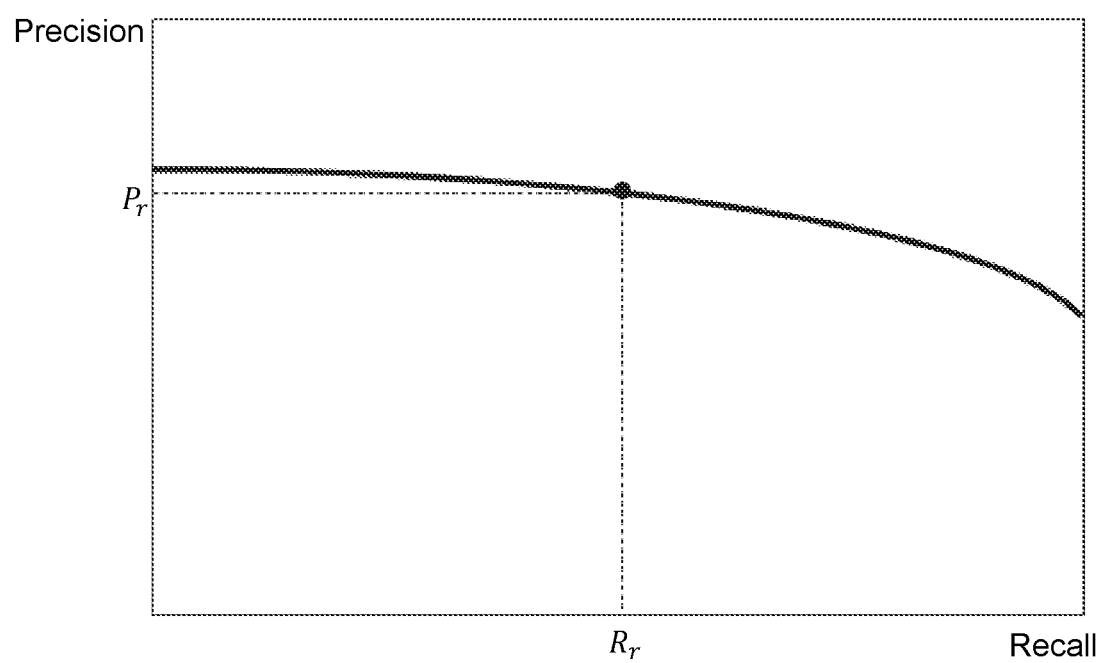
FIG. 10 is a schematic diagram illustrating an exemplary precision-recall relationship according to some embodiments of the present disclosure.

In 820, the processing engine 112 (e.g., the identification module 430) (e.g., the processing circuits of the processor 220) may establish a precision-recall relationship based on the plurality of second historical transportation trip records and the trained identification model. As illustrated in FIG. 10, the precision-recall relationship may be expressed as a curve, where the horizontal axis refers to "recall rate" and the vertical axis refers to "precision rate".

In some embodiments, in order to establish the precision-recall relationship, the processing engine 112 may determine a plurality of second samples based on the plurality of second historical trip records and determine a plurality of second correlation probabilities corresponding to the plurality of second samples based on the trained identification model. Further, the processing engine 112 may determine a plurality of pairs of precision rate and recall rate based on the plurality of second correlation probabilities and establish the precision-recall relationship based on the plurality of pairs of precision rate and recall rate according to, for example, a curve fitting process. More descriptions of establishing the precision-recall relationship may be found elsewhere in the present disclosure (e.g., FIG. 9 and the description thereof).

In 830, the processing engine 112 (e.g., the identification module 430) (e.g., the interface circuits of the processor 220) may obtain a reference precision (also referred to as "reference precision rate"). The reference precision may be default settings of the on-demand service system 100, or may be adjustable under different situations. For example, the reference precision may be a precision rate of a model used in the past by the on-demand service system 100.

In 840, the processing engine 112 (e.g., the identification module 430) (e.g., the processing circuits of the processor 220) may determine a correlation threshold based on the reference precision and the precision-recall relationship. In some embodiments, the precision-recall relationship is associated with a plurality of candidate correlation thresholds. Take the curve illustrated in FIG. 10 as an example, each point on the curve corresponds to a pair of precision rate and recall rate and a specific candidate correlation threshold. After obtaining the reference precision rate, the processing engine 112 may determine the specific candidate correlation threshold corresponding to the reference precision rate based on the precision-recall relationship. More descriptions of the correlation threshold and the precision-recall relationship may be found elsewhere in the present disclosure (e.g., FIG. 9 and the description thereof).

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, in 830, the processing engine 112 may obtain a reference recall rate, therefore, in 840, the processing engine 112 may determine the correlation threshold based on the reference recall rate and the precision-recall relationship.

Figure 9:
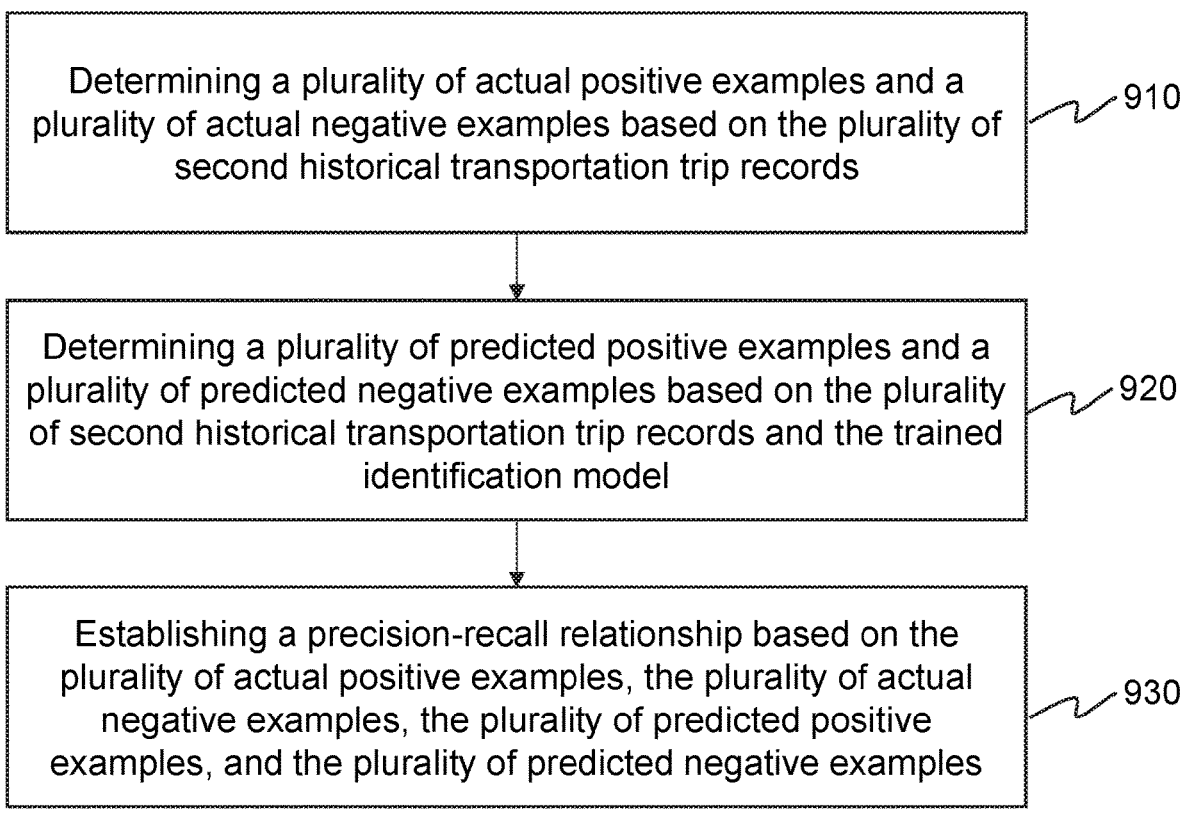
FIG. 9 is a flowchart illustrating an exemplary process for establishing a precision-recall relationship according to some embodiments of the present disclosure.

FIG. 9 is a flowchart illustrating an exemplary process for establishing a precision-recall relationship according to some embodiments of the present disclosure. In some embodiments, the process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting. In some embodiments, operation 820 may be performed based on process 900.

In 910, the processing engine 112 (e.g., the identification module 430) (e.g., the processing circuits of the processor 220) may determine a plurality of actual positive examples and a plurality of actual negative examples (collectively referred to as "second samples") based on the plurality of second historical transportation trip records. As described in connection with 810, each of the plurality of actual positive examples may include the second address query and the selected second POI, each of the plurality of actual negative examples may include the second address query and one of the one or more second POIs other than the selected second POI.

In 920, the processing engine 112 (e.g., the identification module 430) (e.g., the processing circuits of the processor 220) may determine a plurality of predicted positive examples and a plurality of predicted negative examples based on the plurality of second historical transportation trip records and the trained identification model. As described in connection with 650, the processing engine 112 may determine a plurality of second correlation probabilities corresponding to the plurality of second samples based on the trained identification model. The processing engine 112 may determine the plurality of predicted positive examples and the plurality of predicted negative examples based on a plurality of candidate correlation thresholds and the plurality of second correlation probabilities corresponding to the plurality of second samples.

Take a specific candidate correlation threshold as an example, the processing engine 112 may determine a second sample with a second correlation probability larger than the candidate correlation threshold as a predicted positive example, whereas, the processing engine 112 may determine a second sample with a second correlation probability less than or equal to the candidate correlation threshold as a predicted negative example.

In 930, the processing engine 112 (e.g., the identification module 430) (e.g., the processing circuits of the processor 220) may establish a precision-recall relationship based on the plurality of actual positive examples, the plurality of actual negative examples, the plurality of predicted positive examples, and the plurality of predicted negative examples.

In some embodiments, the processing engine 112 may determine a plurality of true positive examples, a plurality of false positive examples, a plurality of true negative examples, and a plurality of false negative examples based on the plurality of actual positive examples, the plurality of actual negative examples, the plurality of predicted positive examples, and the plurality of predicted negative examples. As used herein, a true positive example refers to an actual positive example which is also predicted as a positive example based on the trained identification model, a false positive example refers to an actual negative example but which is predicted as a positive example based on the trained identification model, a true negative example refers to an actual negative example which is also predicted as a negative example based on the trained identification model, and a false negative example refers to an actual positive example but which is predicted as a negative example.

Also take a specific candidate correlation threshold as an example, the processing engine 112 may determine a precision rate and a recall rate according to formula (1) and formula (2) below:

$$P = \frac{TP}{TP + FP} \quad (1)$$

$$R = \frac{TP}{TP + FN} \quad (2)$$

where P refers to the precision rate, TP refers to a number of the plurality of true positive examples, FP refers to a number of the plurality of false positive examples, R refers to the recall rate, and FN refers to a number of the plurality of false negative examples.

For the plurality of candidate correlation thresholds, the processing engine 112 may determine a plurality of precision rates and a plurality of recall rates according to formula (1) and formula (2). Further, the processing engine 112 may establish the precision-recall relationship based on the plurality of precision rates and the plurality of recall rates according to, for example, a curve fitting process.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

FIG. 10 is a schematic diagram illustrating a precision-recall relationship according to some embodiments of the present disclosure. As illustrated in FIG. 10, the horizontal axis refers to "recall rate", and the vertical axis refers to "precision rate". As described in connection with FIG. 9, the processing engine 112 may establish the precision-recall relationship based on a plurality of precision rates and a plurality of recall rates corresponding to a plurality of candidate correlation thresholds. The processing engine 112 may establish the precision-recall relationship based on a mapping approach, an interpolation, a curve fitting process, etc.

As described in connection with 830 and 840, the processing engine 112 may determine a reference precision rate and determine the correlation threshold based on the reference precision rate. As illustrated in FIG. 10, $P_r$ refers to the reference precision rate and $R_r$ refers to a reference recall rate corresponding to the reference precision rate. As described in connection with 930, the reference precision rate or the reference recall rate corresponds to a specific candidate correlation threshold. Accordingly, after determining the reference precision rate or the reference recall rate, the processing engine 112 may determine the corresponding correlation threshold.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system configured to provide an online to offline service to a user, comprising:
   at least one storage medium including a set of instructions; and
   at least one processor in communication with the at least one storage medium, wherein when executing the set of instructions, the at least one processor is directed to:
      obtain an online transportation service request including a target address query via an application being executed on a user terminal associated with the user;
      determine at least one of a prefix, a key term, or a phrase in the target address query;
      determine a plurality of candidate points of interest (POIs) based on the prefix, the key term, or the phrase;
      identify one or more target POIs based on the plurality of candidate POIs by using a trained identification model, which is configured to provide a correlation probability for each of the one or more target POIs with the target address query;
      determine a target correlation threshold associated with the trained identification model based on a precision-recall relationship established based on a plurality of historical transportation trip records and the trained identification model;
      determine whether a number count of eligible target POIs of the one or more target POIs is less than a count threshold, wherein each of the eligible target POIs has a correlation probability with the target address query larger than the target correlation threshold;
      obtain one or more supplementary POIs associated with the target address query from a third party in response to the determination that the number count of the eligible target POIs of the one or more target POIs is less than the count threshold;
      add the one or more supplementary POIs to the one or more target POIs;
      rank the one or more target POIs and the one or more supplementary POIs to produce ranked target POIs and ranked supplementary POIs based on correlation probabilities corresponding to the one or more target POIs and the one or more supplementary POIs;
      transmit the ranked target POIs and the ranked supplementary POIs to the user terminal to be displayed via a user interface on the user terminal;
      select, by the user, a POI from the ranked target POIs and the ranked supplementary POIs as a service location; and
      distribute the service location to a plurality of transportation service providers.

2. The system of claim 1, wherein the trained identification model is determined with a training process, the training process comprising:
   obtaining a plurality of first historical transportation trip records, wherein each of the plurality of first historical transportation trip records includes a first address query from a user, one or more first POIs associated with the first address query, and a first PO selected by the user from the one or more first POIs as a service location of the transportation trip record;
   determining a plurality of first samples including a plurality of first positive samples and a plurality of first negative samples, wherein each of the plurality of first positive samples includes the first address query and the selected first POI and each of the plurality of first negative samples includes the first address query and one of the one or more first POIs other than the selected first POI; and
   determining the trained identification model based on a preliminary identification model, the plurality of first positive samples, and the plurality of first negative samples.

3. The system of claim 2, wherein the determining of the trained identification model based on the preliminary identification model, the plurality of first positive samples, and the plurality of first negative samples includes:
   extracting feature information of each of the plurality of first samples;

determining a plurality of sample correlation probabilities corresponding to the plurality of first samples based on the preliminary identification model and the feature information;

determining whether the plurality of sample correlation probabilities satisfy a preset condition; and designating the preliminary identification model as the trained identification model in response to the determination that the plurality of sample correlation probabilities satisfy the preset condition.

4. The system of claim 3, wherein the feature information of each of the plurality of first samples includes at least one of a first frequency that the first POI was selected as service locations in the plurality of first historical transportation trips, a second frequency that the first POI was transmitted to the users in the plurality of first historical transportation trips, or a similarity between the first address query and the first POI.

5. The system of Tim 1, wherein the trained identification model includes a binary classification tree model.

6. The system of claim 1, wherein to obtain the target correlation threshold associated with the trained identification model, the at least one processor is further directed to:
  obtain the plurality of historical transportation trip records;
  establish the precision-recall relationship based on the plurality of historical transportation trip records and the trained identification model;
  obtain a reference precision value or a reference recall value; and
  determine the target correlation threshold based on the reference precision value or the reference recall value and the precision-recall relationship.

7. The system of claim 6, wherein to establish the precision-recall relationship based on the plurality of historical transportation trip records and the trained identification model, the at least one processor is further directed to:
  determine a plurality of actual positive examples and a plurality of actual negative examples based on the plurality of historical transportation trip records;
  determine a plurality of predicted positive examples and a plurality of predicted negative examples based on the plurality of historical transportation trip records and the trained identification model; and
  establish the precision-recall relationship based on the plurality of actual positive examples, the plurality of actual negative examples, the plurality of predicted positive examples, and the plurality of predicted negative examples.

8. The system of claim 6, wherein
any point on the precision-recall relationship corresponds to a precision value, a recall value, and a candidate correlation threshold, wherein
  the candidate correlation threshold is used to classify a plurality of samples as predicted positive examples and predicted negative examples based on correlation probabilities corresponding to the plurality of samples determined by the trained identification model; and
  the precision value and the recall value are determined based on the predicted positive examples and the predicted negative examples; and
to determine the target correlation threshold based on the reference precision value or the reference recall value and the precision-recall relationship, the at least one processor is further directed to:

determine a candidate correlation threshold corresponding to the reference precision value or the reference recall value on the precision-recall relationship as the target correlation threshold.

9. The system of claim 6, wherein
the reference precision value is a precision value of a previously used model by the system; or
the reference recall value is a recall value of the previously used model by the system.

10. A method implemented on a computing device having at least one processor, at least one storage medium, and a communication platform connected to a network, the method comprising:
  obtaining an online transportation service request including a target address query via an application being executed on a user terminal associated with the user;
  determining at least one of a prefix, a key term, or a phrase in the target address query;
  determining a plurality of candidate points of interest (POIs) based on the prefix, the key term, or the phrase;
  identifying one or more target POIs based on the plurality of candidate POIs by using a trained identification model, which is configured to provide a correlation probability for each of the one or more target POIs with the target address query;
  determining a target correlation threshold associated with the trained identification model based on a precision-recall relationship established based on a plurality of historical transportation trip records and the trained identification model;
  determining whether a number count of eligible target POIs of the one or more target POIs is less than a count threshold, wherein each of the eligible target POIs has a correlation probability with the target address query larger than the target correlation threshold;
  obtaining one or more supplementary POIs associated with the target address query from a third party in response to the determination that the number count of the eligible target POIs of the one or more target POIs is less than the count threshold;
  adding the one or more supplementary POIs to the one or more target POIs;
  ranking the one or more target POIs and the one or more supplementary POIs to produce ranked target POIs and ranked supplementary POIs based on correlation probabilities corresponding to the one or more target POIs and the one or more supplementary POIs;
  transmitting the ranked target POIs and the ranked supplementary POIs to the user terminal to be displayed via a user interface on the user terminal;
  selecting, by the user, a POI from the ranked target POIs and the ranked supplementary POIs as a service location; and
  distributing the service location to a plurality of transportation service providers.

11. The method of claim 10, wherein the trained identification model is determined with a training process, the training process comprising:
  obtaining a plurality of first historical transportation trip records, wherein each of the plurality of first historical transportation trip records includes a first address query from a user, one or more first POIs associated with the first address query, and a first POI selected by the user from the one or more first POIs as a service location of the transportation trip record;
  determining a plurality of first samples including a plurality of first positive samples and a plurality of first negative samples, wherein each of the plurality of first positive samples includes the first address query and the selected first POI and each of the plurality of first negative samples includes the first address query and one of the one or more first POIs other than the selected first POI; and
determining the trained identification model based on a preliminary identification model, the plurality of first positive samples, and the plurality of first negative samples.

12. The method of claim 11, wherein the determining of the trained identification model based on the preliminary identification model, the plurality of first positive samples, and the plurality of first negative samples includes:
extracting feature information of each of the plurality of first samples;
determining a plurality of sample correlation probabilities corresponding to the plurality of first samples based on the preliminary identification model and the feature information;
determining whether the plurality of sample correlation probabilities satisfy a preset condition; and
designating the preliminary identification model as the trained identification model in response to the determination that the plurality of sample correlation probabilities satisfy the preset condition.

13. The method of claim 12, wherein the feature information of each of the plurality of first samples includes at least one of a first frequency that the first POI was selected as service locations in the plurality of first historical transportation trips, a second frequency that the first POI was transmitted to the users in the plurality of first historical transportation trips, or a similarity between the first address query and the first POI.

14. The method of claim 10, wherein the trained identification model includes a binary classification tree model.

15. The method of claim 10, wherein the obtaining of the target correlation threshold associated with the trained identification model includes:
obtaining the plurality of historical transportation trip records;
establishing the precision-recall relationship based on the plurality of historical transportation trip records and the trained identification model;
obtaining a reference precision value or a reference recall value; and
determining the target correlation threshold based on the reference precision value or the reference recall value and the precision-recall relationship.

16. The method of claim 15, wherein the establishing of the precision-recall relationship based on the plurality of historical transportation trip records and the trained identification model includes:
determining a plurality of actual positive examples and a plurality of actual negative examples based on the plurality of historical transportation trip records;
determining a plurality of predicted positive examples and a plurality of predicted negative examples based on the plurality of historical transportation trip records and the trained identification model; and
establishing the precision-recall relationship based on the plurality of actual positive examples, the plurality of actual negative examples, the plurality of predicted positive examples, and the plurality of predicted negative examples.

17. A non-transitory computer readable medium, comprising executable instructions that, when executed by at least one processor, directs the at least one processor to perform a method, the method comprising:
obtaining an online transportation service request including a target address query via an application being executed on a user terminal associated with the user;
determining at least one of a prefix, a key term, or a phrase in the target address query;
determining a plurality of candidate points of interest (POIs) based on the prefix, the key term, or the phrase;
identifying one or more target POIs based on the plurality of candidate POIs by using a trained identification model, which is configured to provide a correlation probability for each of the one or more target POIs with the target address query;
determining a target correlation threshold associated with the trained identification model based on a precision-recall relationship established based on a plurality of historical transportation trip records and the trained identification model;
determining whether a number count of eligible target POIs of the one or more target POIs is less than a count threshold, wherein each of the eligible target POIs has a correlation probability with the target address query larger than the target correlation threshold;
obtaining one or more supplementary POIs associated with the target address query from a third party in response to the determination that the number count of the eligible target POIs of the one or more target POIs is less than the count threshold;
adding the one or more supplementary POIs to the one or more target POIs;
ranking the one or more target POIs and the one or more supplementary POIs to produce ranked target POIs and ranked supplementary POIs based on correlation probabilities corresponding to the one or more target POIs and the one or more supplementary POIs;
transmitting the ranked target POIs and the ranked supplementary POIs to the user terminal to be displayed via a user interface on the user terminal;
selecting, by the user, a POI from the ranked target POIs and the ranked supplementary POIs as a service location; and
distributing the service location to a plurality of transportation service providers.

18. The non-transitory computer readable medium of claim 17, wherein the trained identification model is determined with a training process, the training process comprising:
obtaining a plurality of first historical transportation trip records, wherein each of the plurality of first historical transportation trip records includes a first address query from a user, one or more first POIs associated with the first address query, and a first POI selected by the user from the one or more first POIs as a service location of the transportation trip record;
determining a plurality of first samples including a plurality of first positive samples and a plurality of first negative samples, wherein each of the plurality of first positive samples includes the first address query and the selected first POI and each of the plurality of first negative samples includes the first address query and one of the one or more first POIs other than the selected first POI; and
determining the trained identification model based on a preliminary identification model, the plurality of first positive samples, and the plurality of first negative samples.

19. The non-transitory computer readable medium of claim 18, wherein the determining of the trained identification model based on the preliminary identification model, the plurality of first positive samples, and the plurality of first negative samples includes:
- extracting feature information of each of the plurality of first samples;
- determining a plurality of sample correlation probabilities corresponding to the plurality of first samples based on the preliminary identification model and the feature information;
- determining whether the plurality of sample correlation probabilities satisfy a preset condition; and
- designating the preliminary identification model as the trained identification model in response to the determination that the plurality of sample correlation probabilities satisfy the preset condition.

20. The non-transitory computer readable medium of claim 19, wherein the feature information of each of the plurality of first samples includes at least one of a first frequency that the first POI was selected as service locations in the plurality of first historical transportation trips, a second frequency that the first POI was transmitted to the users in the plurality of first historical transportation trips, or a similarity between the first address query and the first POI.

* * * * *